United States Patent
Norrga et al.

(10) Patent No.: US 7,411,797 B2
(45) Date of Patent: Aug. 12, 2008

(54) CONVERTER INCLUDING A CONTROL DEVICE FOR TURNING ON AN AUXILIARY VALVE WITH A TIME DELAY AND A METHOD FOR CONTROLLING SUCH A CONVERTER

(75) Inventors: Staffan Norrga, Stockholm (SE); Bo Bijlenga, Amal (SE)

(73) Assignee: ABB AB, Västerås (SE)

( * ) Notice: Subject to any disclaimer, the term of this patent is extended or adjusted under 35 U.S.C. 154(b) by 840 days.

(21) Appl. No.: 10/484,092

(22) PCT Filed: Jun. 19, 2002

(86) PCT No.: PCT/SE02/01185

§ 371 (c)(1),
(2), (4) Date: Jul. 9, 2004

(87) PCT Pub. No.: WO03/009459

PCT Pub. Date: Jan. 30, 2003

(65) Prior Publication Data

US 2004/0239298 A1    Dec. 2, 2004

(30) Foreign Application Priority Data

Jul. 16, 2001 (SE) .................................... 0102533

(51) Int. Cl.
   *H02M 3/335* (2006.01)
(52) U.S. Cl. ........................ 363/17; 363/56.02; 363/98

(58) Field of Classification Search .................. 363/16, 363/17, 56.01, 56.02, 98, 132
See application file for complete search history.

(56) References Cited

U.S. PATENT DOCUMENTS

| | | | |
|---|---|---|---|
| 5,880,949 A | 3/1999 | Melhem et al. | |
| 6,587,359 B2 * | 7/2003 | Raets et al. | 363/24 |
| 6,630,751 B2 * | 10/2003 | Curtis et al. | 307/64 |
| 6,798,674 B2 * | 9/2004 | Kwon | 363/39 |

(Continued)

OTHER PUBLICATIONS

Anders Lindberg; "PWM and Control of Two and Three Level High Power Voltage Source Converters"; Kungl Tekniska Hogskolan; Royal Institute of Technology, Department of Electric Power Engineering, Division of High Power Electronics, Stockholm, 1995; Sweden.

(Continued)

*Primary Examiner*—Bao Q Vu
(74) *Attorney, Agent, or Firm*—Venable LLP; Eric J. Franklin (57) ABSTRACT

The invention relates to a converter provided with a resonant circuit (16), which comprises a control device (24) adapted, in connection with a commutation of the phase current ($i_{ph}$) from a semiconductor element of turn-off type of a first current valve (2, 3) to a rectifying member of a second current valve (3, 2) to effectuate a turn-on of the auxiliary valve (18) of the resonant circuit with a varaible time delay ($t_d$) after the turn-off of the first current valve, the converter comprising a member (35) for determining said time delay in dependence on the magnitude and the direction of the phase current ($i_{ph}$) and the magnitude and the direction of a determined unbalance so that the unbalance is corrected at least partly when the control device applies the time delay ($t_d$). The invention also relates to a method for controlling such a converter.

13 Claims, 4 Drawing Sheets

U.S. PATENT DOCUMENTS

2004/0022073 A1* 2/2004 Nielsen .................. 363/17

OTHER PUBLICATIONS

V. Pickert and C.M. Johnson; "DSP Controlled Auxiliary Resonant Commutated Pole Inverter Without Switch Status Sensors"; Seventh International Conference on Power Electronics and Variable Speed Drives (IEE Conf. Publ. No. 456); Sep. 21-23. 1998; pp. 650-655; ISBN 0-85296-704-7; London UK.

Yuan Xiaoming et al.; ARCPI Resonant Snubber for the Neutral-Point-Clamped (NPC) Inverter; Conference Record of the 1999 IEEE Industry Applications Conference;; Thirty-Fourth IAS Annual Meeting (Cat. No. 99CH36370), Proceedings of 34th Annual Meeting of the IEEE Industry Applications; Oct. 3-7, 1999; pp. 1157-1164; ISBN 0-7803-5589-X; vol. 2; Phoenix, AZ.

* cited by examiner

CONVERTER INCLUDING A CONTROL DEVICE FOR TURNING ON AN AUXILIARY VALVE WITH A TIME DELAY AND A METHOD FOR CONTROLLING SUCH A CONVERTER

FIELD OF THE INVENTION AND PRIOR ART

The present invention relates to a converter according to the preamble of claim 1 and a method for controlling such a converter.

The invention particularly relates to a VSC-converter. A VSC-converter for connection between a direct voltage network and an alternating voltage network is previously known e.g. from the thesis "PWM and control of two and three level high voltage source converters" by Anders Lindberg, Royal Institute of Technology, Stockholm, 1995, in which publication a plant for transmitting electric power through a direct voltage network for high-voltage direct current (HVDC), while utilizing such converters, is described. Before the creation of this thesis, plants for transmitting electric power between a direct voltage network and an alternating voltage network have been based upon the use of network commutated CSC (Current Source Converter)—converters in stations for power transmission. However, in this thesis a totally new concept is described, which is based on instead using VSC (Voltage Source Converter)—converters for forced commutation for transmitting electric power between a direct voltage network being voltage stiff therethrough, in the case in question for high-voltage direct current, and alternating voltage networks connected thereto, which offers several considerable advantages as compared to the use of network commutated CSC-converters in HVDC, among which it may be mentioned that the consumption of active and reactive power may be controlled independently of each other and that there is no risk of commutation faults in the converters and thereby no risk of commutation faults being transmitted between different. HVDC-links, as may occur with network commutated CSC:s. Furthermore, it is possible to feed a weak alternating voltage network or a network without any generation of its own (a dead alternating voltage network). There are also further advantages.

The inventive converter may be included in a plant for transmitting electric power through a direct voltage network for high-voltage direct current (HVDC), in order to e.g. transmit the electric power from the direct voltage network to an alternating voltage network. In this case, the converter has its direct voltage side connected to the direct voltage network and its alternating voltage side connected to the alternating voltage network. The inventive converter may however also be directly connected to a load, such as a high-voltage generator or motor, in which case the converter has either its direct voltage side or its alternating voltage side connected to the generator/motor. The invention is not limited to these applications; on the contrary, the converter may just as well be used for conversion in a SVC (Static Var Compensator) or a back-to-back-station. The voltages on the direct voltage side of the converter are with advantage high, 10-400 kV, preferably 130-400 kV. The inventive converter may also be included in other types of FACTS-devices (FACTS=Flexible Alternating Current Transmission) than the ones mentioned above.

In order to limit the turn-off losses in the semiconductor elements of turn-off type of the current valves of the converter, i.e. the losses in the semiconductor elements of turn-off type when these are turned off, it is previously known to arrange capacitive members in the form of so-called snubber capacitors connected in parallel across the respective semiconductor element of turn-off type. It is also known to provide the converter with a so-called resonant circuit for recharging said snubber capacitors in connection with commutation of the phase current. Hereby, it will also be possible to limit the turn-on losses in the semi-conductor elements of turn-off type of the current valves, i.e. the losses in the semiconductor elements of turn-off type when these are turned on.

A type of converter provided with a resonant circuit that has been developed and come into use is the so-called ARCP-converter (ARCP=Auxiliary Resonant Commutated Pole). An ARCP-converter comprises a series connection of at least two intermediate link capacitors arranged between the two poles of the direct voltage side of the converter, said series connection being divided into two equal parts through a midpoint, denominated intermediate link midpoint in the following, so as to provide in the intermediate link midpoint a voltage essentially corresponding to the mean value of the voltage between the two poles. In connection with a commutation of the phase current assisted by the resonant circuit, a current pulse corresponding to a certain charge will flow in the resonant circuit either into or out of the intermediate link midpoint. These current pulses tend to displace the voltage in the intermediate link midpoint in one or the other direction. However, the phase currents are sinusoidal in most cases, the sum thereof therefore being zero. In theory, the total sum of the charge supplied to or withdrawn from the intermediate link point through the resonant circuit during the commutations in the different phase legs of the converter is therefore also to become zero over a fundamental-tone period, i.e. the mean value in time of the difference between the voltage across one of the intermediate link capacitors and the voltage across the other intermediate link capacitor is in theory to remain zero during a fundamental-tone period. However, this mean value will in practice be displaced in one or the other direction due to for instance unbalance in the phase current, defects in the components of the converter or in the control of the converter. This displacement normally constitutes a slow process taking place over several fundamental-tone periods. The voltage unbalance caused by said displacement may for instance result in that the voltage across the current valve that is to be turned on during a commutation process never reaches the value zero, which in its turn results in increased turn-on losses and in worst case in destruction of the semiconductor element of turn-off type of said current valve, since the current valve will be turned on when it has voltage across itself. In HVDC-applications, where the intermediate link midpoint of the converters is grounded, said voltage unbalance may result in undesired ground currents between the intermediate link midpoints of converters that are connected to each other, which ground currents i.a. entail increased losses.

In this description and the subsequent claims the expression "unbalance of the voltage in the intermediate link" refers to a difference between the voltage between one of the poles and the intermediate link midpoint and the voltage between the intermediate link midpoint and the other pole. In the ideal case, this difference is zero, i.e. the voltage is in the ideal case the same across the two intermediate link capacitors. The "direction of the unbalance" refers to whether the unbalance implies that the voltage between said one of the poles and the intermediate link midpoint is larger or smaller than the voltage between the intermediate link midpoint and the other pole, i.e. whether the unbalance depends on that an additional charge amount has been supplied to or withdrawn from the intermediate link midpoint. The "magnitude of the unbalance" refers to the magnitude, i.e. the absolute value, of the difference between the voltage between one of the poles and the intermediate link midpoint and the voltage between the intermediate link midpoint and the other pole.

In previously known ARCP-converters the resonant circuit is activated in connection with communication of the phase current from a semiconductor element of turn-off type of a first current valve to a rectifying member of a second current valve, i.e. in connection with the turning-off of a semiconductor element of the first current valve, when the phase current is so low that the switching time for the voltage in the phase output otherwise would be unreasonably long.

A method for correcting occurring voltage unbalances in the intermediate link of an ARCP-converter is described in U.S. Pat. No. 5,880,949. This method is based on that the outgoing current valve is turned off with a variable time delay after the activation of the resonant circuit. Consequently, an additional current pulse is conducted through the resonant circuit in connection with a commutation assisted by the resonant circuit so as to thereby supply an additional charge amount to or withdraw an additional charge amount from the intermediate link midpoint, which additional charge amount corrects the unbalance at least partly. Consequently, this method is based on that an additional current of suitable magnitude is added to the resonant current in case of a noted unbalance of the voltage in the intermediate link. A disadvantage with this method is that said additional current causes an increase of the peak value of the current through the resonant circuit, and consequently increased losses in the resonant circuit. These increased losses can be considered to be in direct contravention of the purpose of the resonant circuit, which purpose is to reduce the losses in the converter in connection with commutation of the phase current.

OBJECT OF THE INVENTION

The object of the present invention is to make it possible to correct occurring unbalances of the voltage in the intermediate link of a converter, while avoiding the above-mentioned increase of losses in the resonant circuit.

SUMMARY OF THE INVENTION

According to the invention, said object is achieved by means of a converter according to claim 1 and a method according to claim 9.

The inventive solution implies that the control device of the converter, in connection with a commutation of the phase current from a semiconductor element of turn-off type of a first current valve to a rectifying member of a second current valve, is made to effectuate a turn-on of the auxiliary valve with a variable time delay after the turn-off of the first current valve, said time delay being determined in dependence on the magnitude and the direction of the phase current and the magnitude and the direction of a determined unbalance so that the unbalance is corrected at least partly when the control device applies the time delay. Consequently, the unbalance is corrected in that the auxiliary valve in connection with a commutation of the phase current is turned on with a certain time delay after the turn-off of the outgoing current valve, in contrast to the method known from U.S. Pat. No. 5,880,949 where the outgoing current valve is turned off with a certain time delay after the turn-on of the auxiliary valve. Consequently, according to the present invention, no adding of an additional current to the resonant current is used for the correction of the unbalance, and an increase of the peak value of the current through the resonant circuit, which increase is unfavourable with respect to the losses, is thereby avoided.

According to a preferred embodiment of the invention, the value of the unbalance of the voltage in the intermediate link is filtered, the time delay being determined in dependence on this filtered value. Hereby, it is secured that the corrections essentially will relate to the slow and undesired displacements of the voltage in the intermediate link that are remaining during several periods of the network voltage.

Further preferred embodiments of the inventive converter and the inventive method will appear from the dependent claims and the subsequent description.

BRIEF DESCRIPTION OF THE DRAWING

The invention will in the following be more closely described by means of embodiment examples, with reference to the appended drawing. It is shown in.

DETAILED DESCRIPTION OF PREFERRED EMBODIMENTS

Figure 1:
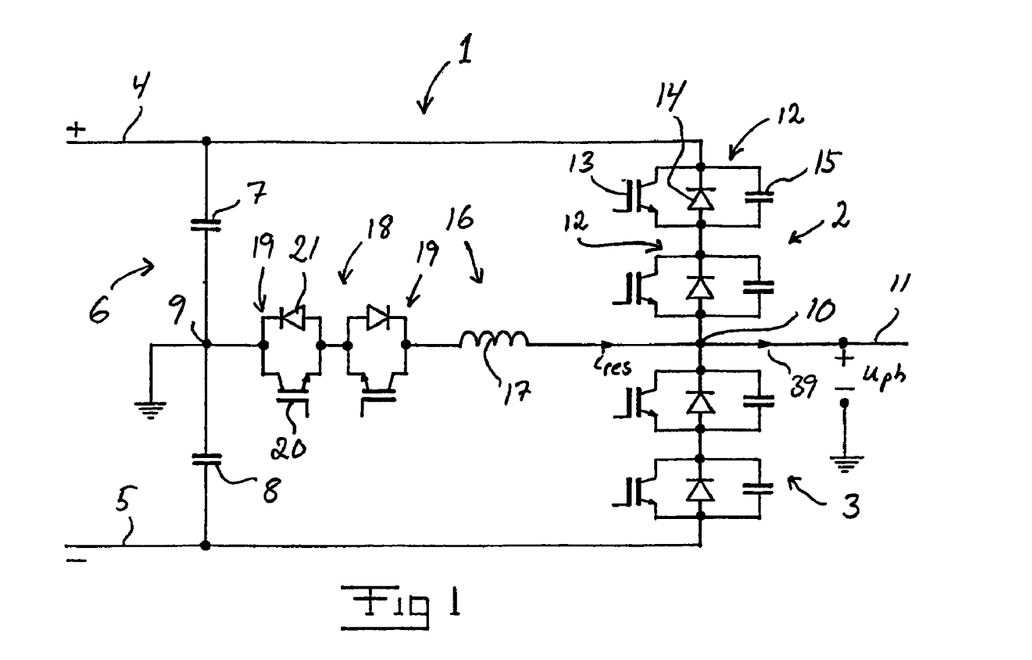
FIG. 1 a simplified circuit diagram illustrating a converter according to a first embodiment of the invention, FIG. 2 a simplified circuit diagram illustrating a converter according to an alternative embodiment of the invention, FIGS. 3-5 current curves and voltage curves during different commutation processes, FIG. 6 a simplified block diagram illustrating a control system for effectuation of the inventive method, FIG. 7 a diagram illustrating the change of the current through the resonant circuit and the phase voltage during a commutation process with a timedelayed and a non-timedelayed, respectively, turn-on of the auxiliary valve of the converter, and FIG. 8 a diagram illustrating a displacement of the limit value for positive phase currents.

A converter according to an embodiment of the invention is illustrated in FIG. 1. The converter is here a so-called VSC-converter. In FIG. 1, only the part of the converter that is connected to one phase of an alternating voltage phase line is shown, the number of phases normally being three, but this may also constitute the entire converter when this is connected to a single phase alternating voltage network. The shown part of the converter constitutes a so-called phase leg, and a converter adapted for instance to a three-phase alternating voltage network comprises three phase legs of the type shown.

VSC-converters are known in several designs. In all designs, a VSC-converter comprises a number of so-called current valves, each of which comprising a semiconductor element of turn-off type, such as an IGBT (Insulated Gate Bipolar Transistor) or a GTO (Gate Turn-Off Thyristor), and a rectifying member in the form of a diode, a so-called free wheeling diode, connected in anti-parallel therewith. Each semiconductor element of turn-off type is normally in high-voltage applications built up of several series connected, simultaneously controlled semi-conductor components of turn-off type, such as several separate IGBT:s or GTO:s. In high-voltage applications a comparatively high number of such semiconductor components is required in order to hold the voltage to be held by each current valve in the blocking state. In the corresponding manner, each rectifying member is built up of several series connected rectifying components. The semiconductor components of turn-off type and the rectifying components are in the current valve arranged in several series connected circuits, each of which circuits comprising i.a. a semiconductor component of turn-off type and a rectifying component connected in anti-parallel therewith.

The phase leg of the converter illustrated in FIG. 1 has two current valves 2, 3 connected in series between the two poles 4, 5 of a direct voltage side of the converter. A direct voltage intermediate link 6 comprising two so-called intermediate link capacitors is arranged between the two poles 4, 5. In the converter illustrated in FIG. 1 the intermediate link 6 comprises two series contacted intermediate link capacitors 7, 8. A midpoint 9, here denominated intermediate link midpoint, between these capacitors 7, 8 is here, as customary, connected to ground, so as to provide the potentials $+U_d/2$ and $-U_d/2$, respectively, at the respective pole, $U_d$ being the voltage between the two poles 4, 5. The grounding point 9 may however be excluded, for instance in SVC-applications.

A midpoint 10 of the series connection between the two current valves 2 and 3, which constitutes the phase output of the converter, is connected to an alternating voltage phase line 11. In this manner, said series connection is divided into two equal parts with a current valve 2 and 3, respectively, in each such part. In the embodiment with three phase legs, the converter consequently comprises three phase outputs, which are connected to a respective alternating voltage phase line of a three-phase alternating voltage network. The phase outputs are normally connected to the alternating voltage network via electric equipment in the form of breakers, transformers etc.

In the embodiment shown, the respective current valve 2, 3 comprises, in accordance with the above indicated, several series connected circuits 12, each of which circuits comprising a semiconductor component 13 of turn-off type, such as an IGBT, an IGCT, a MOSFET, a JFET, a MCT or a GTO, and a rectifying component 14 in the form of a diode, a so-called free wheeling diode, connected in anti-parallel therewith. In the embodiment shown in FIG. 1, each current valve 2, 3 comprises two series connected circuits 12 of the type described above, but the series connected circuits 12 may be larger as well as smaller in number. Depending i.a. on the voltage for which the converter is designed, the number of said series connected circuits 12 in the respective current valve 2, 3 may extend from two up to several hundred.

Each of the series connected circuits 12 of the respective current valve 2, 3 is provided with a capacitor 15, here denominated snubber capacitor, connected in parallel with the semi-conductor component 13 of turn-off type included in the circuit. The capacitance of the respective snubber capacitor 15 must be so high that a good voltage distribution between the semi-conductor components 13 of turn-off type included in the respective current valve is made possible in connection with turn-off of the semiconductor components of turn-off type of a current valve. The choice of capacitance of the snubber capacitors 15 is adapted from case to case and depends i.a. on the current-handling capacity of the semiconductor components 13 of turn-off type and the rectifying components 14. The snubber capacitors 15 help to limit the turn-off losses of the current valves, i.e. the losses in the semiconductor components of turn-off type when these are turned off.

When the semiconductor components 13 of a current valve are turned off, the snubber capacitors 15 that are connected across these semiconductor components 13 will be charged. If the snubber capacitors 15 keep this charge when the semi-conductor components 13 subsequently are turned on, turn-on losses will ensue in the semiconductor components 13. The relatively high capacity snubber capacitors 15 that will come into question in this connection will in this case cause very high turn-on losses, which turn-on losses make the use of high switching frequencies impossible. In order to eliminate or at least reduce these turn-on losses, and make possible the use of high switching frequencies, the snubber capacitors 15 are included in a resonant circuit 16. Hereby, it will be possible to accomplish discharge of the snubber capacitors 15 of a current valve when the semi-conductor components 13 of the current valve are to be turned on, so that the voltage across the respective semiconductor component 13 is equal to or close to zero when it is turned on, whereby the turn-on losses are limited.

It is also possible to include a capacitor arranged between the phase output 10 and the midpoint 9 of the direct voltage intermediate link in the resonant circuit 16.

Figure 2:
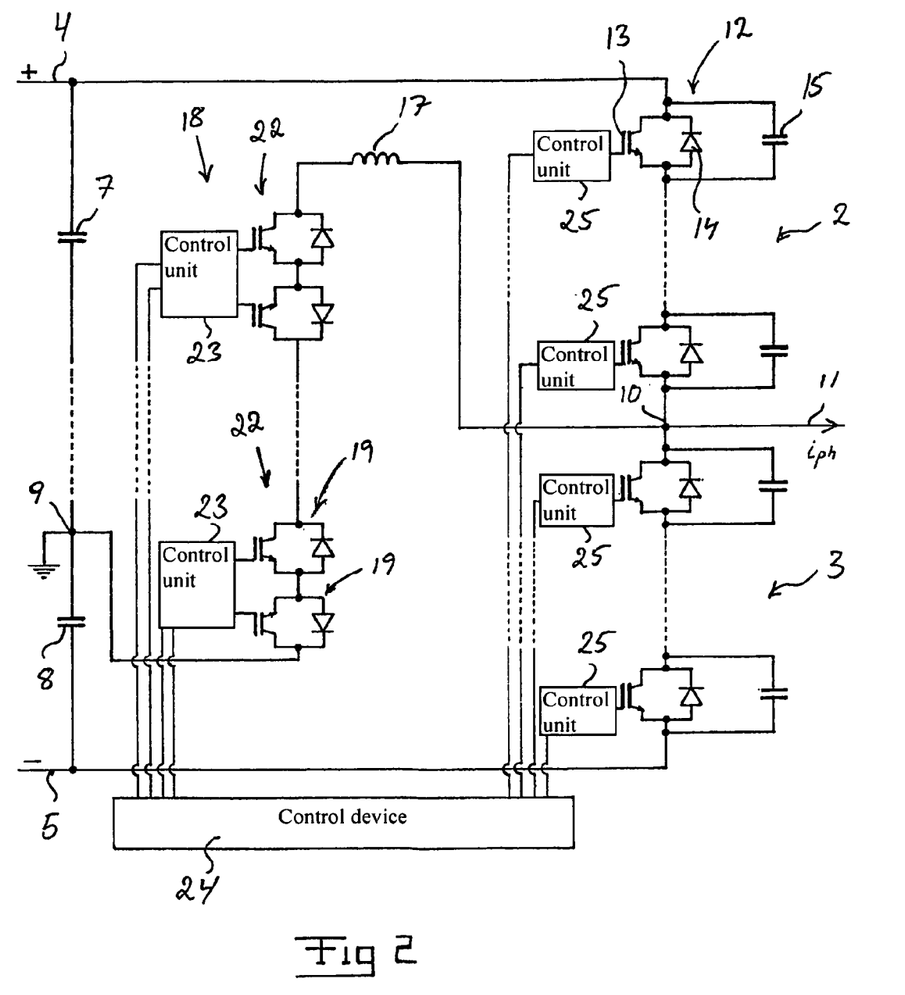

The converters illustrated in FIGS. 1 and 2 are of the type denominated ARCP-converter. The resonant circuit 16 is here of so-called quasi-resonant type, which implies that the resonance only is initiated when the current is to be commutated between two current valves, i.e. when the voltage on the phase output is to be changed-over.

In the embodiment shown in FIG. 1, the resonant circuit 16 comprises a series connection of an inductor 17 and an auxiliary valve 18 arranged between the phase output 10 and the midpoint 9 of said series connection of intermediate link capacitors 7, 8. The auxiliary valve 18 here comprises a set of two series connected auxiliary valve circuits 19, each of which comprising a semiconductor component 20 of turn-off type, such as an IGBT, an IGCT, a MOSFET, a JFET, a MCT or a GTO, and a rectifying component 21 in the form of a diode connected in anti-parallel therewith. The semiconductor components 20 of turn-off type of the two auxiliary valve circuits 19 are arranged in opposite polarity in relation to each other. This auxiliary valve 18 constitutes a bi-directional valve that can be made to conduct in one or the other direction.

In this description and the subsequent claims, the expression auxiliary valve refers to a current valve included in the resonant circuit 16 of the converter.

The auxiliary valve 18 may also comprise several series connected sets of auxiliary valve circuits if considered appropriate, as illustrated in FIG. 2. In the embodiment illustrated in FIG. 2, the resonant circuit comprises an auxiliary valve 18 comprising several series connected sets 22 of auxiliary valve circuits, each set comprises two series connected auxiliary valve circuits 19 of the type described above. Only two series connected sets 22 of auxiliary valve circuits of the auxiliary valve 18 are shown in FIG. 2, but the number of such sets may be considerably larger than that. The number of sets of auxiliary valve circuits in the auxiliary valve 18 may be optimised independently of the number of series connected circuits 12 in the current valves 2, 3, and depends i.a. on the voltage the auxiliary valve is to be able to hold in the blocking state and the characteristics of the individual semiconductor components 20 that are being used. Generally, it can be observed that the auxiliary valve 18 in the blocking state only has to hold half the pole voltage, i.e. $U_d/2$, in contrast to the current valves 2, 3, which each has to be dimensioned so as to be able to hold the entire pole voltage $U_d$ in the blocking state.

Each set 22 of auxiliary valve circuits 19 in the auxiliary valve 18 is suitably, as illustrated in FIG. 2, provided with its own control unit 23, which is adapted to control the turn-on and turn-off of the semiconductor components 20 of turn-off type included in the set, all control units 23 of the auxiliary valve being connected to a common control device 24, which is adapted to send control signals to all these control units 23. Hereby, a simultaneous control of all the auxiliary valve circuits 19 of the auxiliary valve is secured.

It is further preferred that each of the semiconductor components 13 of turn-off type included in the current valves 2, 3 of the converter, as illustrated in FIG. 2, is provided with its own control unit 25, which is adapted to control the turn-on and turn-off of the semiconductor components 13, all control units 25 of the current valves being connected to a common control device 24, which is adapted to send control signals to all the control units 25 included in a current valve 2, 3. Hereby, a simultaneous control of all the semiconductor components 13 of a current valve is secured. The control units 23 of the auxiliary valve and the control units 25 of the current valves are here connected to one and the same control device 24, which is to be preferred.

There are three basic processes for commutation of the phase current in a converter of the type illustrated in FIGS. 1 and 2, which basic processes will be briefly described in the following.

The current valve which is current carrying in the initial state, i.e. when the commutation process is initiated, is in this description and the subsequent claims denominated "the first current valve" or "the outgoing current valve", and the current valve which is to be made current carrying by the commutation is denominated "the second current valve". It is realized that the one of the two current valves 2, 3 illustrated in FIGS. 1 and 2 that at each specific commutation occasion constitutes "the first" current valve and "the second" current valve, respectively, will vary from case to case.

In this description and in the subsequent claims, the expression "a commutation not assisted by the resonant circuit" implies that the series connection of auxiliary valve 18 and inductor 17 included in the resonant circuit does not take part in the commutation process. However, the capacitive members, i.e. the snubber capacitors 15, will of course take part in this commutation process. In the corresponding manner, the expression "a commutation assisted by the resonant circuit" implies that the series connection of auxiliary valve 18 and inductor 17 included in the resonant circuit is taking part in the commutation process.

Figure 3:
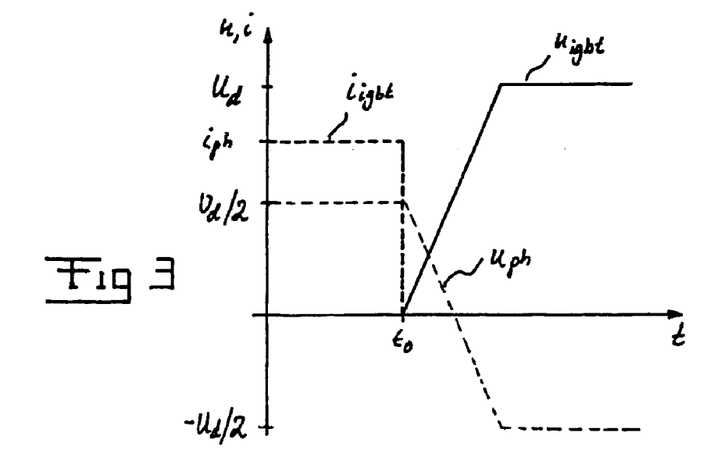

A first commutation process implies commutation of the phase current from a semiconductor element of turn-off type of a current carrying first current valve 2, 3 to a rectifying member of a second current valve 3, 2 without any assistance of the resonant circuit 16. The commutation process is initiated in that the semi-conductor element of turn-off type of the first current valve is turned off, whereupon the phase current $i_{ph}$ produces a charging of the capacitive members of the first current valve, i.e. its snubber capacitors 15, and a discharge of the capacitive members of the second current valve, i.e. its snubber capacitors 15. The phase potential will hereby swing from one pole to the other pole. In FIG. 3 the change of the current $i_{lgbt}$ and the voltage $u_{lgbt}$ of the semiconductor element of turn-off type of the first current valve as well as the phase voltage $u_{ph}$ during the commutation process is illustrated. The semiconductor element of turn-off type of the first current valve is turned off at the instant $t_0$, whereupon the current through the semiconductor element in the ideal case directly goes down to zero. In reality the semi-conductor element will have a certain reverse recovery current. The phase current $i_{ph}$ will thereafter produce a charging of the capacitive members of the first current valve, the voltage there-across and thereby across the semiconductor element of turn-off type increasing essentially linearly from zero up to a value $U_d$ corresponding to the voltage between the poles 4, 5. It is realized that the turn-off of the semiconductor element of the first current valve may take place essentially without any power dissipations.

A second commutation process implies commutation of the phase current from a semiconductor element of turn-off type of a current carrying first current valve 2, 3 to a rectifying member of a second current valve 3, 2 with the assistance of the resonant circuit 16. This commutation process is used at low phase currents in order to accelerate the commutation. The commutation process is initiated by turning on the semiconductor component of turn-off type (the embodiment according to FIG. 1), or whenever applicable the semiconductor components of turn-off type (the embodiment according to FIG. 2), to which voltage is (are) applied in the auxiliary valve. At the same time as the semi-conductor component(-s) of the auxiliary valve is (are) turned on, the semiconductor element of the first current valve is turned off. A resonance period will now follow, during which the resonant circuit provides to the phase output 10 a current conducing to the charging of the snubber capacitors 15 of the first current valve and discharging of the snubber capacitors 15 of the second current valve. After the voltage across the second current valve has fallen to zero or to a value close to zero, the semiconductor element of turn-off type of the second current valve is turned on. At the same time as or after the semiconductor element of the second current valve is turned on, the semiconductor component(-s) 20 of turn-off type that was (were) initially turned on in the auxiliary valve 18 is (are) turned off.

Figure 4:
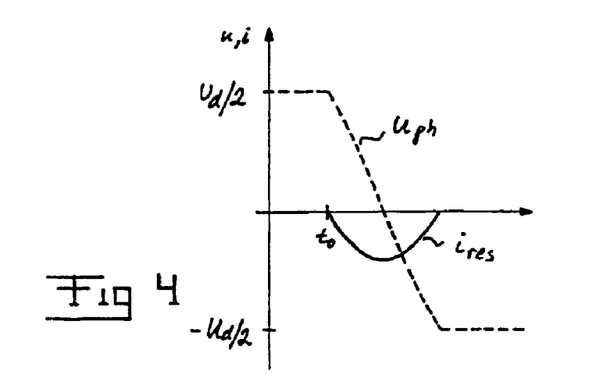

FIG. 4 illustrates the change of the current $i_{res}$ through the resonant circuit and the phase voltage $u_{ph}$ during the above-described commutation process. The semi-conductor component(-s) of turn-off type of the auxiliary valve 18 is (are) turned on at the instant $t_0$. In the case illustrated in FIG. 4, the semiconductor element of turn-off type of the first current valve is turned off at the same instant $t_0$.

A third commutation process implies commutation of the phase current from a rectifying member of a current carrying first current valve 2, 3 to a semiconductor element of turn-off type of a second current valve 3, 2 with the assistance of the resonant circuit 16. The commutation process is initiated by turning on the semiconductor component of turn-off type (the embodiment according to FIG. 1), or whenever applicable the semi-conductor components of turn-off type (the embodiment according to FIG. 2), to which voltage is (are) applied in the auxiliary valve, whereupon a so-called ramp-up period is initiated. During the ramp-up period the current in the resonant circuit will, under the influence of the voltage $u_{d1}$, $u_{d2}$ across one of the two intermediate link capacitors 7, 8, increase from zero to a value corresponding to the phase current $i_{ph}$. When the current through the resonant circuit reaches a value corresponding to the phase current $i_{ph}$, a resonance period begins, during which the snubber capacitors 15 of the first current valve are being charged and the snubber capacitors 15 of the second current valve are being discharged. When the voltage across the second current valve has fallen to zero or to a value close to zero, the semi-conductor component of turn-off type of the second current valve is turned on. After the resonance period a so-called ramp-down period begins, during which the current in the resonant circuit decreases to zero from a value corresponding to the phase current $i_{ph}$. When the ramp-down period is over and the current has fallen to zero in the resonant circuit, the semiconductor component(-s) 20 of turn-off type that was (were) initially turned on in the auxiliary valve 18 is (are) turned off.

Figure 5:
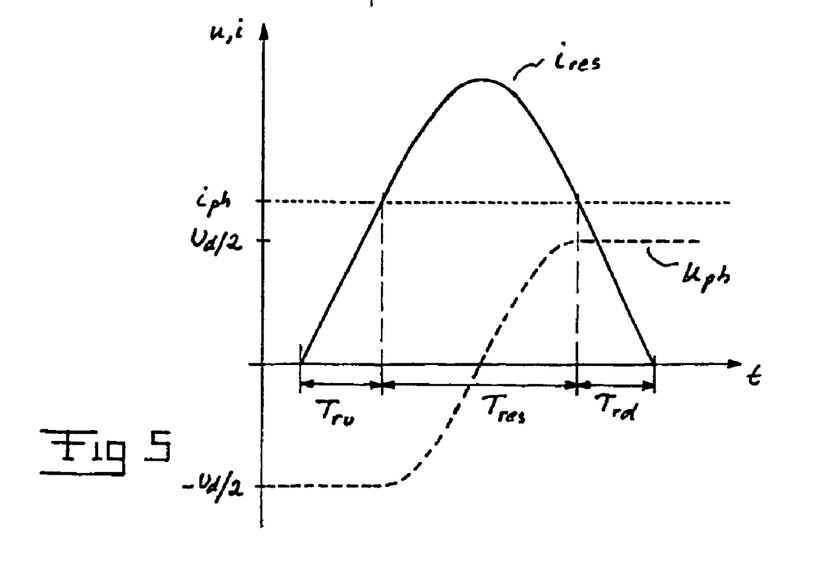

FIG. 5 illustrates the change of the current $i_{res}$ through the resonant circuit and the phase current $u_{ph}$ during the above-described commutation process.

Figure 6:
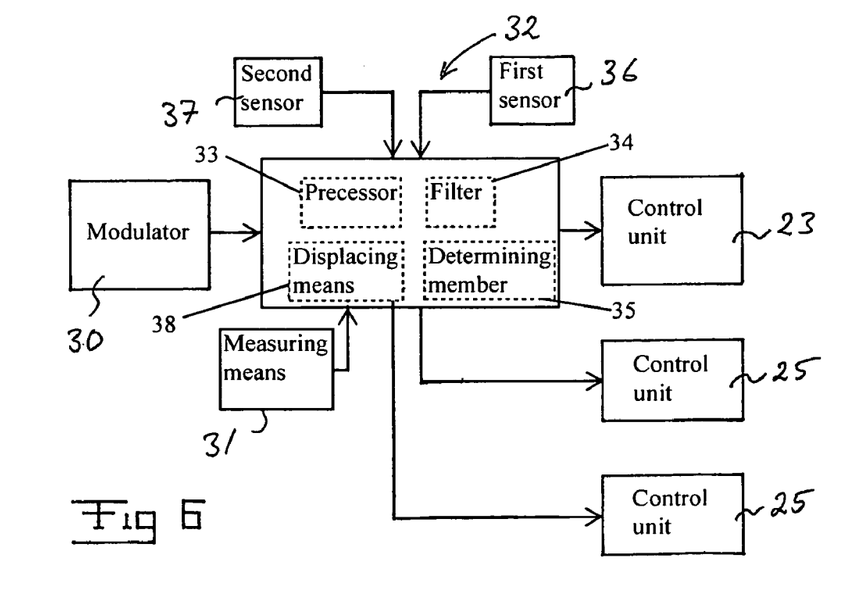

The inventive converter is preferably controlled with PWM-technique (PWM=Pulse Width Modulation), the control device 24 being supplied with signals representing the desired commutation instants from a modulator 30, schematically illustrated in FIG. 6.

The inventive converter is provided with means for measuring the phase current $i_{ph}$, schematically indicated at 31 in FIG. 6, which means is adapted to transmit measuring signals to the control device 24.

The previously described unbalance of the voltage in the intermediate link is i.a. caused by the current pulses flowing through the auxiliary valve 18 and the inductor 17 of the resonant circuit in connection with commutations of the phase current, I.e. In connection with the above-mentioned second and third type of commutation process. The inventive converter comprises means for determining an unbalance of the voltage in the intermediate link. This means comprises a device 32 for measuring of voltage and a processing unit 33 adapted to process the measuring values from said device 32 for determining the magnitude and the direction of said unbalance. The processing unit 33 may be integrated in the control device 24, as illustrated in FIG. 6, or constitute a unit being separate therefrom. According to a preferred embodiment of the invention, the device 32 comprises a first sensor 36 for measuring the voltage $u_{d1}$ between the intermediate link midpoint 9 and one 4 of the poles and a second sensor 37 for measuring the voltage $u_{d2}$ between the intermediate link midpoint 9 and the other pole 5, the processing unit 33 being adapted to calculate the difference $\Delta u_d = u_{d1} - u_{d2}$ between said voltages in order to determine the magnitude and the direction of the voltage unbalance in the intermediate link 6.

It is preferred that the means for determining an unbalance of the voltage in the intermediate link 6 comprises a device 34 for filtering the value of said unbalance provided by the processing unit 33. This device 34 may be integrated in the processing unit 33 or the control device 24 or be separate therefrom.

According to the invention, the control device 24 is adapted, in connection with a commutation of the phase current $i_{ph}$ from a semiconductor element of turn-off type of a first current valve 2, 3 to a rectifying member of a second current valve 3, 2, to effectuate a turn-on of the auxiliary valve 18 with a variable time delay $t_d$ after the turn-off of the first current valve 2. The converter comprises a member 35 for determining said time delay $t_d$ in dependence on the magnitude and the direction of the phase current at the commutation moment and the size and the magnitude of a determined unbalance so that the unbalance is corrected at least partly when the control device applies the time delay $t_d$. Said member 35 may be integrated in the control device 24, as illustrated in FIG. 6, or be separate therefrom.

In a first extreme case the time delay $t_d=0$, in which case the auxiliary valve is turned on at the same time as the first, i.e. the outgoing, current valve is turned off and the resonant circuit is fully used in the commutation. In a second extreme case, the commutation takes place completely without any assistance of the resonant circuit, i.e. the time delay $t_d$ is so chosen that it will not flow any current through the inductor and the auxiliary valve of the resonant circuit during the commutation. The latter case can be said to correspond to a case where $t_d=T/2$, where T stands for the duration of a commutation process taking place without any assistance of the resonant circuit and is given by the formula $$T = \frac{C_s \cdot U_d}{|i_{ph}|}$$

where $U_d$ is the voltage across the series connection 6 of intermediate link capacitors, $i_{ph}$ is the phase current and $C_s$ is the snubber capacitance, i.e. the sum of total, series connected snubber capacitance for one 2 of the valves, total, series connected snubber capacitance for the other valve 3 and, whenever applicable, the capacitance of the capacitor arranged between the phase output 10 and the midpoint 9 of the intermediate link. If the auxiliary valve is turned on with a time delay corresponding to T/2 after the turn-off of the outgoing current valve, no current will pass through the auxiliary valve 18 and the inductor 17 during the commutation.

Figure 7:
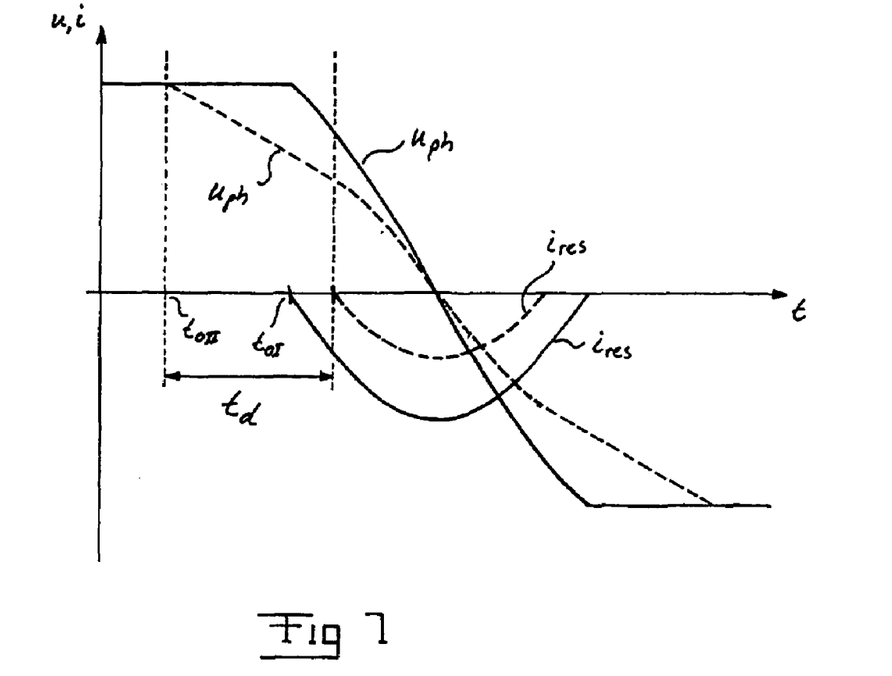

The changes of the phase voltage $u_{ph}$ and the current $i_{res}$ through the resonant circuit in connection with a commutation process where the auxiliary valve 18 is turned on at the same time as the outgoing current valve is turned off (here denominated Case I), i.e. at the instant $t_{0I}$, are shown with continuous curves in FIG. 7. The corresponding changes in connection with a commutation process where the auxiliary valve 18 is turned on with a certain time delay $t_d$ after the turn-off of the outgoing current valve (here denominated Case II), in which case the outgoing current valve is turned off at the instant $t_{0II}$ and the auxiliary valve is turned on at the instant $t=t_{0II}+t_d$, are shown with dashed curves. For illustrative purposes, the curves have been drawn so that the zero passing of the phase voltage coincides in the two different cases.

As appears from FIG. 7, the current pulse through the resonant circuit will get a shorter duration in Case II than in Case I. Furthermore, the peak value of the current pulse through the resonant circuit will be lower in Case II than in Case I, as also appears from FIG. 7. Consequently, a smaller charge amount will be supplied to or withdrawn from the intermediate link midpoint in Case II than in Case I. It is realized that the magnitude of the difference in supplied/withdrawn charge amount between the two cases depends on the magnitude of the time delay $t_d$. Whether a charge is supplied to or withdrawn from the intermediate link midpoint 9 will of course depend on the direction of the current through the resonant circuit, which direction in its turn is given by the direction of the phase current at the commutation moment. It is realized that it is possible by a suitable choice of time delay $t_d$ to control how large amount of charge that is supplied to or withdrawn from the intermediate link midpoint 9 at a specific commutation, whereby the voltage across the intermediate link capacitors 7, 8 and thereby the voltage unbalance in the intermediate link can be adjusted in the desired direction.

The table below exemplifies how the time delay $t_d$ generally is intended to be adjusted depending on the direction of the phase current and the direction of the voltage unbalance in the intermediate link. In the table, $\Delta u_d^f$ denotes the filtered value of $\Delta u_d = u_{d1} - u_{d2}$. It is emphasized that the adjustment of the time delay $t_d$ is carried out also in consideration of other requirements that are relevant for the commutation, such as maximum allowed duration of the commutation.

|  | $i_{ph} > 0$ | $i_{ph} < 0$ |
| --- | --- | --- |
| $\Delta u_d^f > 0$ | $t_d$ decreased | $t_d$ increased |
| $\Delta u_d^f < 0$ | $t_d$ increased | $t_d$ decreased |

The member 35 is preferably adapted to use the above-mentioned filtered value of the voltage unbalance in the intermediate link in the determination of the time delay $t_d$. In case a more advanced regulation of the unbalance is desired, previous values of the filtered value of the unbalance may also be used for determination of the time delay $t_d$ in connection with a commutation. A PID-regulator (PID=Proportional Integral Derivative) may for instance be implemented for the purpose of correcting the unbalance.

A noted unbalance of the voltage in the intermediate link is normally adjusted in several steps, i.e. in connection with several consecutive commutations. The number of steps required for adjustment of an unbalance depends i.a. on the magnitude of the unbalance and the upper limit for the time delay $t_d$ for the present value of the phase current. This upper limit depends i.a. on the requirements of a maximum allowed duration of the specific commutation.

If the converter has several phase legs and the resonant circuits of the phase legs are connected to the midpoint of a common direct voltage intermediate link, the choice of the time delay $t_d$ is suitably coordinated between the different phase legs. Since the phase currents normally sum up to zero, they will have different signs. This creates good opportunities for counteracting unbalances in the intermediate link in accordance with the inventive method.

In previously known ARCP-converters, the control device is, in connection with the commutation of the phase current from a semiconductor element of turn-off type of a first current valve to a rectifying member of a second current valve, normally adapted to send a turn-on signal to the auxiliary valve only in those cases when the phase current at the commutation moment has an absolute value being lower than a determined limit value G. This limit value is chosen based on the fact that the phase current, when the absolute value thereof at the commutation moment is higher than the limit value, is to be capable of recharging the snubber capacitors without assistance of a resonance current within a time that is short enough with respect to the control of the converter. However, if the absolute value of the phase current is lower than the limit value, assistance by a resonance current is required for allowing the recharging of the snubber capacitors to take place fast enough. Consequently, said limit value indicates how low the phase current is to be for the resonant circuit to be activated, i.e. for the auxiliary valve to be turned on during the commutation.

In the inventive converter and the inventive method, the resonant circuit may, however, be activated for the purpose of correcting a noted voltage unbalance in the intermediate link even when this is not required with regard to the commutation time, i.e. even when the phase current is high enough for being capable of recharging the snubber capacitors without assistance by a resonance current in a time that is sufficiently short with respect to the control of the converter. In such a case, the purpose of the activation of the resonant circuit is consequently to correct the unbalance in the intermediate link and not to speed up the commutation process.

According to a special case of the inventive method, only the values $t_d=0$ and $t_d=T/2$ of the time delay $t_d$ are used, i.e. values according to the two previously described extreme cases. This case is distinguished from previously known solutions in that an adjustment of the above-mentioned limit value is used in the correction of a determined voltage unbalance of the intermediate link. In this case, the converter comprises means 38 for displacing the limit-value $G_{+i}$ for positive phase currents upwards or the limit value $G_{-i}$ for negative phase currents downwards in dependence on the direction of the unbalance so as thereby to correct the unbalance at least partly. Said means 38 may be integrated in the control device 24, as illustrated in FIG. 6, or be separate therefrom. The means 38 is preferably adapted to use the above-mentioned filtered value of the unbalance in the determination of the magnitude and the direction of the displacement. The means 38 is preferably adapted to adjust the magnitude of a limit value displacement in dependence on the magnitude of a determined unbalance.

Figure 8:
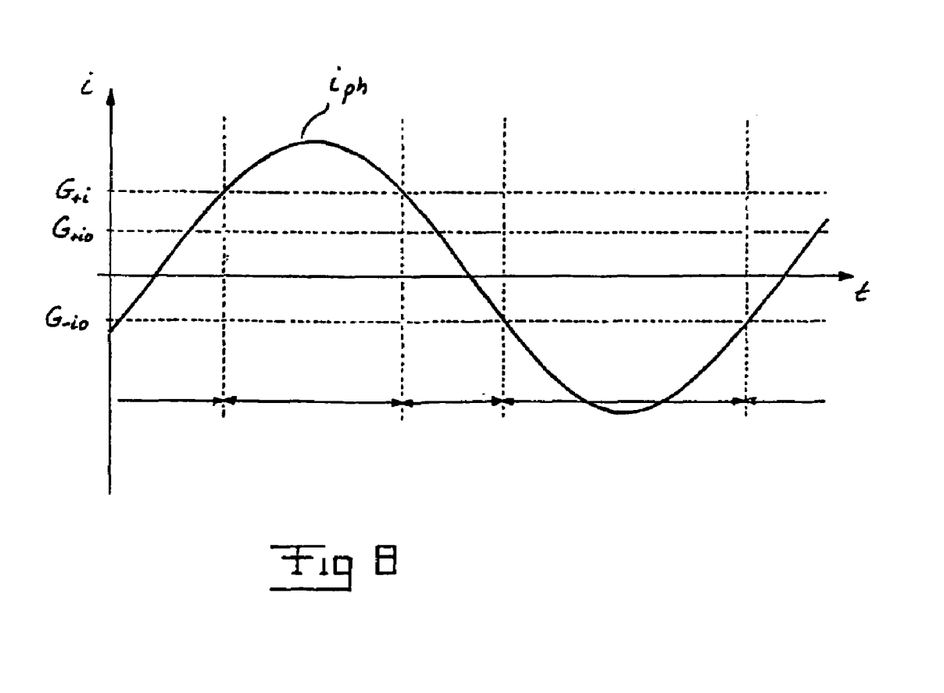

A case where the limit value $G_{+i}$ for positive phase currents has been displaced upwards from the normal value $G_{+i0}$ is illustrated in FIG. 8. It clearly appears from FIG. 8 that more commutations where the resonant circuit is assisting will take place when $i_{ph}>0$ than when $i_{ph}<0$, whereby a larger charge amount than normally (with the positive direction of the current defined by the arrow 39 in FIG. 1) will be withdrawn from the intermediate link midpoint 9 as seen over an entire network voltage period. In the corresponding manner, a larger charge amount than normally will be supplied to the intermediate link midpoint 9 as seen over an entire network voltage period when the limit value $G_{-i}$ for negative phase currents is displaced downwards from the normal value $G_{i0}$. In this manner, an additional charge amount can consequently be supplied to or withdrawn from the intermediate link midpoint 9, whereby the voltage across the intermediate link capacitors and thereby the voltage in the intermediate link midpoint 9 can be adjusted in the desired direction.

In the table below, it is exemplified how the limit values $G_{+i}$, $G_{-i}$ generally are intended to be adjusted in dependence on the direction of the phase current and the direction of the voltage unbalance in the intermediate link. In the table, $\Delta u_d^f$ denotes the filtered value of $\Delta u_d = u_{d1} - u_{d2}$. It is emphasized that the adjustment of the limit values $G_{+i}$, $G_{-i}$ is carried out also in consideration of the other requirements that are relevant for the commutation.

|  | $i_{ph} > 0$ | $i_{ph} < 0$ |
| --- | --- | --- |
| $\Delta u_d^f > 0$ | $G_{+i}$ displaced upwards | $G_{-i}$ displaced upwards |
| $\Delta u_d^f < 0$ | $G_{+i}$ displaced downwards | $G_{-i}$ displaced downwards |

It is realized that the turn-off and turn-on, respectively, of the semiconductor element of turn-off type of a current valve as described above and as indicated in the claims, refer to the simultaneous turn-off and turn-on, respectively, of all the semi-conductor components 13 of turn-off type of a current valve in those cases where the respective current valve comprises several series connected circuits 12 of previously indicated type.

The invention is of course not in any way restricted to the preferred embodiments described above, on the contrary many possibilities to modifications thereof should be apparent to a person skilled in the art without departing from the basic idea of the invention as defined in the appended claims.

The invention claimed is:

1. A converter comprising:
    a series connection of at least two current valves arranged between two poles, a positive and a negative, of a direct voltage side of the converter, each of which current valves comprising a semiconductor element of turn-off type and a rectifying member connected in anti-parallel therewith, an alternating voltage phase line being connected to a midpoint, denominated phase output, of the series connection between two current valves while dividing the series connections into two equal parts,
    an intermediate link, arranged between the two poles of the direct voltage side of the converter, which intermediate link comprises a series connection of at least two intermediate link capacitors, said series connection being divided into two equal parts through a midpoint, denominated intermediate link midpoint,
    a resonant circuit comprising a series connection of an inductor and an auxiliary valve arranged between the phase output and the intermediate link midpoint, which auxiliary valve comprises at least two semiconductor components of turn-off type arranged in opposite polarity in relation to each other, the resonant circuit further comprising capacitive members, each of which being connected in series with said inductor and auxiliary valve and in parallel with one of said current valves, a control device for controlling turn-on and turn-off of the semiconductor elements of turn-off type of the current valves and the semiconductor components of turn-off type of the auxiliary valve, means for measuring the phase current and means for determining an unbalance of the voltage in the intermediate link, i.e. determining a difference between the voltage between one of the poles and the intermediate link midpoint and the voltage between the intermediate link midpoint and the other pole, wherein the control device is adapted, in connection with a commutation of the phase current from a semiconductor element of turn-off type of a first current valve to a rectifying member of a second current valve), to effectuate a turn-on of the auxiliary valve with a variable time delay after the turn-off of the first current valve, the converter comprising a member for determining said time delay in dependence on the magnitude and the direction of the phase current and the magnitude and the direction of a determined unbalance so that the unbalance is corrected at least partly when the control device applies the time delay.

2. The converter according to claim 1, wherein the means for determining an unbalance of the voltage in the intermediate link comprises a device for filtering the value of said unbalance, the member for determining the time delay being adapted to determine the time delay in dependence on this filtered value.

3. A converter according to claim 1, characterized in that the means for determining an unbalance of the voltage in the intermediate link comprises a device for measuring a first voltage between the intermediate link midpoint and one of the poles and a second voltage between the intermediate link midpoint and the other pole, and that this means is adapted to determine said unbalance by calculating the difference between said first and second voltage.

4. The converter according to claim 1, wherein the converter comprises means for producing a displacement of a limit value, which controls for what values of the phase current the resonant circuit is to be activated in connection with a commutation, this means being adapted to displace the limit value for positive phase currents upwards or the limit value for negative phase currents downwards in dependence on the direction of the unbalance so as thereby to correct the unbalance at least partly.

5. The converter according to claim 4, wherein the means for displacing the limit value is adapted to adjust the magnitude of a limit value displacement in dependence on the magnitude of a determined unbalance.

6. The converter according to claim 1, wherein the respective current valve consists of several series connected circuits, each of which circuits comprising a semiconductor component of turn-off type and a rectifying component connected in anti-parallel therewith, a snubber capacitor included in said capacitive members being connected in parallel with the semiconductor component of turn-off type included in the circuit.

7. The converter according to claim 1, wherein the auxiliary valve comprises two semiconductor components of turn-off type series connected in opposite polarity in relation to each other and two rectifying components connected in anti-parallel with a respective one of the semiconductor components of turn-off type of the auxiliary valve.

8. The converter according to claim 1, wherein the auxiliary valve comprises several series connected sets of auxiliary valve circuits, each set comprising two series connected auxiliary valve circuits, each of which comprising a semiconductor component of turn-off type and a rectifying component connected in anti-parallel therewith, the semiconductor components of turn-off type of the two auxiliary valve circuits in one and the same set being arranged in opposite polarity in relation to each other.

9. A method for controlling a converter, which converter comprises a series connection of at least two current valves arranged between two poles, a positive and a negative, of a direct voltage side of the converter, each of which current valves comprising a semiconductor element of turn-off type and a rectifying member connected in anti-parallel therewith, an alternating voltage phase line being connected to a midpoint, denominated phase output, of the series connection between two current valves while dividing the series connection into two equal parts, an intermediate link arranged between the two poles of the direct voltage side of the converter, which intermediate link comprises a series connection of at least two intermediate link capacitors, said series connection being divided into two equal parts through a midpoint, denominated intermediate link midpoint, a resonant circuit comprising a series connection of an inductor and an auxiliary valve arranged between the phase output and the intermediate link midpoint, which auxiliary valve comprises at least two semiconductor components of turn-off type arranged in opposite polarity in relation to each other, the resonant circuit further comprising capacitive members, each of which being connected in series with said inductor and auxiliary valve and in parallel with one of said current valves, a control device for controlling turn-on and turn-off of the semiconductor elements of turn-off type of the current valves and the semiconductor components of turn-off type of the auxiliary valve, means for measuring the phase current and means for determining an unbalance of the voltage in the intermediate link, i.e. determining a difference between the voltage between one of the poles and the intermediate link midpoint and the voltage between the immediate link midpoint and the other pole, wherein the control device, in connection with a commutation of the phase current from a semiconductor element of turn-off type of a first current valve to a rectifying member of a second current valve, is made to effectuate a turn-on of the auxiliary valve with a variable time delay after the turn-off of the first current valve, said timedelay being determined in dependence on the magnitude and the direction of the phase current and the magnitude and the direction of a determined unbalance so that the unbalance is corrected at least partly when the control device applies the time delay.

10. The method according to claim 9, wherein the value of the unbalance of the voltage in the intermediate link is filtered, the time delay being determined in dependence on this filtered value.

11. The method according to claim 9, wherein the voltage between the intermediate link midpoint and one of the poles and the voltage between the intermediate link midpoint and the other pole are measured, and that an unbalance of the voltage in the intermediate link is determined by calculating the difference between said voltages.

12. The method according to claim 9, wherein a displacement of a limit value is produced, which limit value controls for what values of the phase current the resonant circuit is to be activated in connection with a commutation, the limit value for positive phase currents being displaced upwards or the limit value for negative phase currents being displaced downwards in dependence on the direction of the unbalance, so as thereby to correct the unbalance at least partly.

13. The method according to claim 12, wherein the magnitude of a limit value displacement is adjusted in dependence on the magnitude of a determined unbalance.

* * * * *